(12) United States Patent
Metzger et al.

(10) Patent No.: US 11,652,392 B2
(45) Date of Patent: May 16, 2023

(54) METHOD FOR FORMING A CROWN FROM A PLURALITY OF U-SHAPED ELECTRICALLY CONDUCTIVE HAIRPINS

(71) Applicant: GROB-WERKE GmbH & Co. KG, Mindelheim (DE)

(72) Inventors: Manfred Metzger, Rammingen (DE); Markus Schmölz, Kaufbeuren (DE)

(73) Assignee: GROB-WERKE GmbH & Co. KG, Mindelheim (DE)

( * ) Notice: Subject to any disclaimer, the term of this patent is extended or adjusted under 35 U.S.C. 154(b) by 0 days.

(21) Appl. No.: 17/523,619

(22) Filed: Nov. 10, 2021

(65) Prior Publication Data

US 2022/0069682 A1     Mar. 3, 2022

Related U.S. Application Data

(62) Division of application No. 16/624,107, filed as application No. PCT/DE2018/100574 on Jun. 20, 2018, now Pat. No. 11,218,061.

(30) Foreign Application Priority Data

Jun. 20, 2017   (DE) .................... 10 2017 113 617.7

(51) Int. Cl.
  *H02K 15/06*     (2006.01)
  *H02K 1/16*      (2006.01)
  (Continued)

(52) U.S. Cl.
  CPC ........... *H02K 15/064* (2013.01); *B21D 39/03* (2013.01); *H02K 1/16* (2013.01); *H02K 3/12* (2013.01);
  (Continued)

(58) Field of Classification Search
  CPC ........ H02K 3/12; H02K 3/14; H02K 15/0087; H02K 15/085; H02K 1/30; H02K 15/0421;
  (Continued)

(56) References Cited

U.S. PATENT DOCUMENTS 7,243,414 B2 *  7/2007  Even ................... H02K 15/064
                                                29/760
7,941,910 B2    5/2011  Guercioni
(Continued)

FOREIGN PATENT DOCUMENTS

EP       0162317 A2    11/1985
JP       2013102569 A * 11/2011

OTHER PUBLICATIONS

International Search Report; priority document.

*Primary Examiner* — Thiem D Phan
(74) *Attorney, Agent, or Firm* — Greer, Burns & Crain, Ltd.

(57) ABSTRACT

A pre-fitting nest and a method serve for forming a crown from a plurality of U-shaped electrically conductive hairpins to then be able to install the crown in a machine element of an electric machine, e.g., a stator. Here, an accommodating member has a plurality of grooves in which the legs of the hairpins are accommodated. The grooves are annularly disposed about a center and extend perpendicularly to the plane of the accommodating member. With respect to their size and geometry, they are configured such that in each case a first leg of a hairpin rotates within the groove thus to enable an unconstrained positioning of the second leg of the hairpin in another groove. One or several crowns formed from hairpins are provided for introduction into a machine element and inserted into the machine element.

18 Claims, 8 Drawing Sheets

(51) Int. Cl.
    *H02K 3/12*            (2006.01)
    *H02K 3/48*            (2006.01)
    *H02K 3/50*            (2006.01)
    *B21D 39/03*          (2006.01)

(52) U.S. Cl.
    CPC ............... *H02K 3/48* (2013.01); *H02K 3/505* (2013.01); *Y10T 29/53143* (2015.01)

(58) Field of Classification Search
    CPC ............ H02K 15/064; Y10T 29/49012; Y10T 29/53143; Y10T 29/49009
    USPC ...... 29/596, 564.5, 598, 606, 729, 732, 735, 29/738, 871
    See application file for complete search history.

(56) References Cited

U.S. PATENT DOCUMENTS

| | | |
|---|---|---|
| 9,722,475 B2 | 8/2017 | Niccolini et al. |
| 2019/0199184 A1* | 6/2019 | Oshel ..................... H02K 3/12 |

* cited by examiner

SdT

SdT

METHOD FOR FORMING A CROWN FROM A PLURALITY OF U-SHAPED ELECTRICALLY CONDUCTIVE HAIRPINS

CROSS-REFERENCES TO RELATED APPLICATIONS

This application is a division of U.S. Ser. No. 16/624,107 filed Dec. 18, 2019 and claims the benefit of the International Application No. PCT/DE2018/100574, filed on Jun. 20, 2018, and of the German patent application No. 10 2017 113 617.7 filed on Jun. 20, 2017, the entire disclosures of which are incorporated herein by way of reference.

FIELD OF THE INVENTION

The invention relates to a pre-fitting nest and a method for forming an annular crown from a plurality of U-shaped electrically conductive hairpins in order to then be able to install the crown in a machine element of an electric machine. The invention further relates to a device for manufacturing a machine element of an electric machine.

BACKGROUND OF THE INVENTION

Electric machines are understood to be, in particular, machines for converting electrical energy into kinetic energy and machines for converting kinetic energy into electrical energy. In particular, this term is to be understood to mean electric motors and generators.

When manufacturing machine elements of such electric machines, such as stators and rotors, for example, it is often necessary to connect ends of electrical conductors formed from wires with each other or otherwise process them together, such as cut them or shape them together, for example.

For instance, there are electric motors in which coil windings, particularly of the stator, are formed from a plurality of wire pieces whose ends are connected together. Such wire pieces are often referred to as pins or hairpins. The wire from which the hairpins are formed may, in particular, have a rectangular cross section, be configured as a flat, rectangular or profile wire, or be provided in the form of flat strip steel or the like.

For example, a stator member with a plurality of grooves serves for accommodating the hairpins.

An example of a known hairpin is shown in a lateral view in FIG. 2a. The hairpin 1 has two legs 1a, 1b extending parallel to each other, and several angles resulting in the shape of a roof, which is also referred to as a house roof shape. In order to fit a plurality of hairpins in as densely packed a manner as possible when manufacturing stators, the hairpins are often bent, in their roof regions, in a direction extending perpendicularly to the plane of the hairpin, i.e. perpendicular to the drawing plane of FIG. 2a.

FIG. 2b shows the hairpin in an enlarged view from above onto its roof. In this view, the two legs 1a, 1b of the hairpin 1 extend perpendicularly to the drawing plane. The wire bent in this manner has a three-dimensional shape or 3D shape.

In order to manufacture, for example, a stator using hairpins as electrical conductors, the different hairpins often must be installed in the stator so as to form one or several annular crowns. At their ends, or the ends of their legs, the individual hairpins are electrically connected to one another and thus form a densely packed coil winding in the shape of one or several crowns. The ends of the hairpins are commonly connected by welding.

In order to connect the phases of the stator to a power electronic system, an element for a corresponding interconnection, for example, is electrically connected to the crown assembly.

In the methods for producing a stator with hairpin technology known thus far, the hairpins are manually fitted into the stator directly.

FIG. 3a shows, by way of example, a known stator 200 in a view from above, which has a plurality of grooves 211 for accommodating hairpins 1. The legs 1a, 1b of the hairpins 1 are positioned by fitting them into the grooves 211.

FIG. 3b shows an enlarged section of the known stator in a partial view from above. The two legs 1a, 1b of an individual hairpin or pin are fitted into a respectively assigned groove 211a, 211b. These two grooves are spaced apart, so that the hairpin or pin extends with its roof across several grooves 211 situated between them, into which further hairpins are fitted, so as to result in a crown-shaped arrangement of superposed hairpins. In order to obtain a high packing density of the hairpins and thus of the stator windings, the hairpins have to be positioned very close to each other.

The known techniques for producing machine elements, such as stators, for example, using hairpins present the following drawbacks, in particular:

Manually fitting the hairpins into the stator is time-consuming and incurs high costs.

Due to the grooves 211 being arranged in a radiating shape, viewed from the center of the stator, the U-shaped pins or hairpins barely have clearance in the respective groove. For the fitting process, however, the outer leg of the hairpin has to be fitted at a radius that is farther outside than is the case later in the stator, after all hairpins have been fitted into the stator and are in their final position. With an arrangement of grooves in a radiating shape in the stator, this is not possible in a reliable manner.

Thus, tensions in the hairpins may arise after they have been fitted into the stator, which may have disadvantageous effects.

In addition, the known arrangement generates a force pulling the fitted pins or hairpins towards the center of the accommodating means. This is disadvantageous in subsequent working processes.

SUMMARY OF THE INVENTION

It is an object of the invention to enable, in the production of a machine element, such as a stator, for example, an automated fitting of the hairpins and ensure a reliable fitting process with a high packing density.

In order to achieve this object, the invention provides a pre-fitting nest for forming an annular crown from a plurality of U-shaped electrically conductive hairpins in order to then be able to install the crown in a machine element of an electric machine, comprising an accommodating member with a plurality of grooves for accommodating the legs of the U-shaped hairpins, wherein the grooves are annularly disposed about a center Z and extend perpendicularly to the plane of the accommodating member, and the grooves are configured in such a way, with respect to their size and geometry, that in each case a first leg of a hairpin can be rotated within the groove in order thus to enable an unconstrained positioning of the second leg of the hairpin in another groove.

By forming one or several crowns of U-shaped hairpins in advance by means of a pre-fitting nest, i.e., before the hairpins are installed in a stator, for example, an automated and reliable fitting with a high packing density can take place, e.g., by means of a robot. The invention further makes it possible to collect or fit the pins in an accommodating means to form a crown. For example, the different crowns may be collected in an accommodating means in order to then be able to insert them into a machine element, particularly into a stator.

Advantageously, the grooves of the accommodating member are considerably larger than the cavities of the machine element or stator for accommodating the hairpins. This enables the automatic fitting of the U-shaped pins or hairpins in an even better manner.

The grooves of the accommodating member are configured in such a way that the hairpins are moved into their intended position in the accommodating member by the influence of gravity. Thus, the hairpins fall into their intended positions even better, resulting in an even easier positioning process.

Preferably, the grooves of the accommodating member are disposed in a radiating shape about the center Z. In particular, they may have side walls that extend in the radial direction in relation to the center Z. For example, the grooves may have a width B that increases outwards in the radial direction.

Advantageously, the grooves of the accommodating member are disposed offset or slightly offset with respect to one another, e.g., in the shape of a turbine. Thus, the one leg of a hairpin is more easily able to rotate about the center of the other leg in the accommodating member. Thus, the hairpins are protected even better from damage when they are fitted. They have more space in the accommodating member and are not subjected to any force.

The grooves of the accommodating member may, in each case, have side walls that extend in the direction of a point P outside the center Z. In particular, the points P of the individual grooves may, for example, be disposed on a circle around the center Z.

These actions improve the non-constrained positioning of the hairpins even more, and reduce the risk of possible damage even further.

Preferably, the accommodating member has an inner ring on whose outer face the side walls of the grooves are formed in order to retain the hairpins in their respective positions.

Advantageously, the accommodating member has an outer ring on whose inner face the side walls of the grooves are formed in order to retain the hairpins in their respective positions.

In particular, the accommodating member may be configured in such a way that there is no inner ring or no outer ring. In this case, the hairpins are retained in their position by the geometry of the accommodating member.

In particular, the accommodating member may have an inner ring and an outer ring between which the grooves are formed as cavities.

For example, the accommodating member has holding members disposed on the inner ring and/or the outer ring in order to form the grooves. In particular, it may have holding members configured as bolts, studs or metal sheets or the like in order to accommodate the hairpins or to form the grooves for accommodating the hairpins.

Advantageously, the grooves are configured in such a way that several annular crowns of individual hairpins are formed by accommodating the legs of the hairpins. For example, after a crown has been completed, the individual crowns may be joined, e.g., in an accommodating member configured as a collection receptacle.

For example, the grooves may have an inclined portion and/or one or more offsets in order to position one or several hairpins or hairpin crowns in the radial direction. The radial positioning of the individual crowns ensures the joining of several crowns in the accommodating member. Moreover, a crown to be joined is prevented from colliding with a crown that was already joined.

Because of the inclined portion and/or the offsets, which are formed, for example, on the upper side of the accommodating member in the region of the grooves, the hairpins or hairpin crowns are brought to an outer diameter and positioned there by gravity or a force acting from outside.

Advantageously, the pre-fitting nest has a frustoconical shape in the region of the grooves.

In particular, the grooves may have side walls at whose upper ends an inclined portion and/or one or more steps are formed.

For example, the pre-fitting nest is configured as a multiple pre-fitting nest for forming several crown layers.

In particular, due to the geometry of the accommodating member, the invention makes it possible, with a robot in an automated manner, to fit the hairpins together to form crowns, and also to collect several crowns in an accommodating means.

According to one aspect, the invention provides a device for manufacturing a machine element of an electric machine, comprising a pre-fitting nest for forming a crown from a plurality of U-shaped electrically conductive hairpins, a machine element housing for accommodating the hairpins, and an apparatus for delivering and inserting the crown of U-shaped hairpins into the machine element housing.

In particular, the pre-fitting nest may, in this case, be configured in accordance with the invention.

According to another aspect, the invention provides a method for forming a crown from a plurality of U-shaped electrically conductive hairpins in order to then be able to install the crown in a machine element of an electric machine, comprising the steps of:

providing a plurality of U-shaped electrically conductive hairpins;

joining the hairpins by fitting the legs of the hairpins into an accommodating member, so that the hairpins together form a crown;

wherein, when the respective hairpin is fitted into the accommodating member, a first leg of the hairpin is rotatably held in the accommodating member in order to position the second leg of the hairpin in the accommodating member by rotation about the first leg;

then providing the crown of hairpins for introduction into a hairpin accommodating means of the machine element.

Advantageously, the accommodating member has grooves for accommodating the hairpins which are larger than the grooves of the machine element or the stator for accommodating the hairpins.

For example, the grooves may be disposed in a radiating shape. They may also be disposed in an offset manner relative to one another.

Preferably, the hairpins fall into their respectively intended position due to the influence of gravity.

Advantageously, several crowns are formed and joined to form a multi-layer crown member.

Preferably, a crown or several crowns, subsequent to their manufacture, are inserted into a machine element or stator. The insertion of several crowns into the machine element or stator may take place individually and one after the other, or also together as an assembly of several crowns.

In particular, the method is carried out with a pre-fitting nest according to the invention.

According to another aspect of the invention, a pre-fitting nest according to the invention is used for carrying out the method according to the invention.

According to an additional aspect, a device according to the invention is used for carrying out the method according to the invention.

Advantages and details of the invention mentioned in connection with the pre-fitting nest according to the invention also apply to the device according to the invention and the method according to the invention, just as advantages and details mentioned in connection with the method according to the invention or the device according to the invention also apply to the pre-fitting nest according to the invention.

DETAILED DESCRIPTION OF THE PREFERRED EMBODIMENTS

Figure 1:
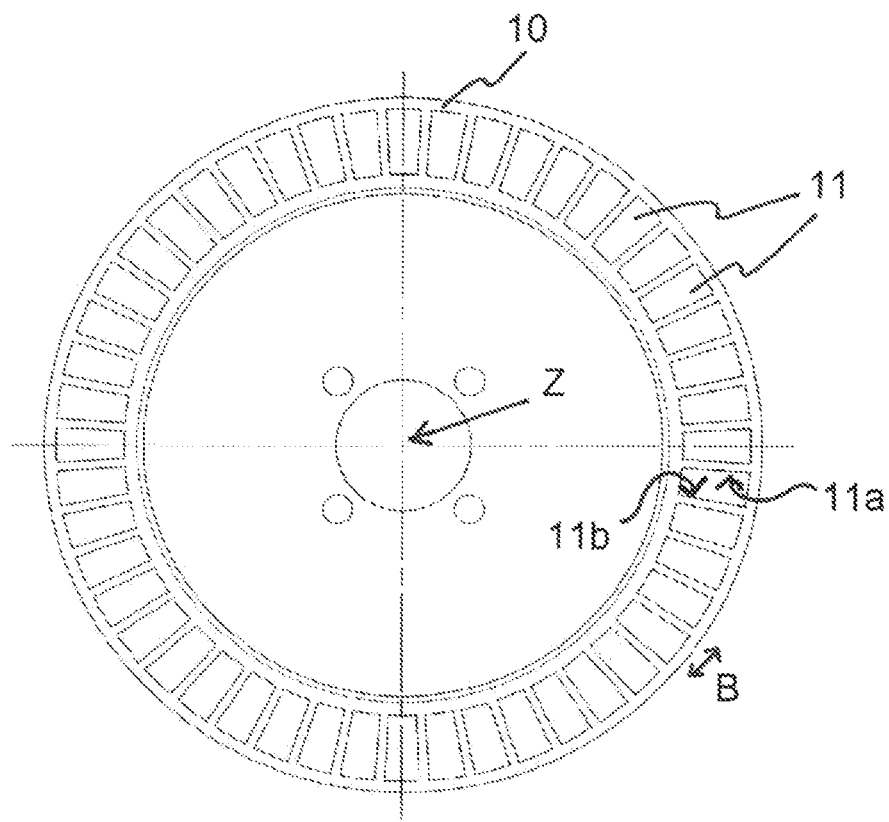
FIG. 1 shows a schematic illustration of a pre-fitting nest of the invention according to a preferred embodiment, as a view from above.

FIG. 1 shows a pre-fitting nest 100 according to a preferred embodiment of the invention in a view from above. The pre-fitting nest 100 serves for forming at least one crown from a plurality of U-shaped electrically conductive hairpins, so that the crown can then be installed in a machine element of an electric machine. In this example, the crown is to be installed in a stator which is suitable particularly for an electric motor of a motor vehicle.

The pre-fitting nest 100 comprises an accommodating member 10 with a plurality of grooves 11 serving for accommodating the legs 1a, 1b of U-shaped hairpins 1. One example of such known hairpins 1 was described above with reference to the FIGS. 2a and 2b. However, differently configured hairpins than those shown in FIGS. 2a and 2b may also be accommodated in the device 100.

In the accommodating member 10, grooves 11 are annularly disposed about a center Z of the pre-fitting nest 100. Here, the grooves 11 extend perpendicularly to the plane of the accommodating member 10, i.e. perpendicularly to the drawing plane of FIG. 1.

Figure 2A:
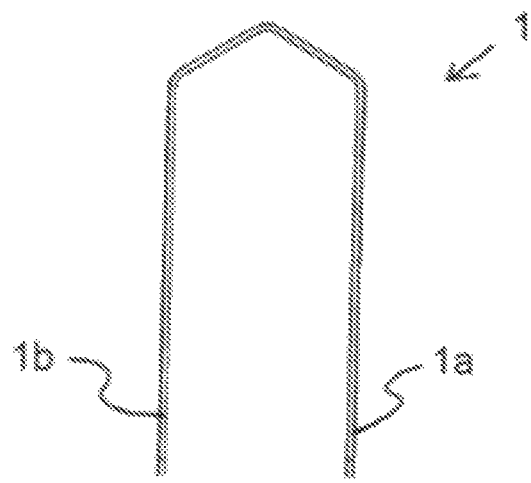
FIGS. 2a and 2b show a schematic illustration of a known hairpin in a lateral view (FIG. 2a) and in a view from above onto the roof of the hairpin (FIG. 2b)
Figure 2B:
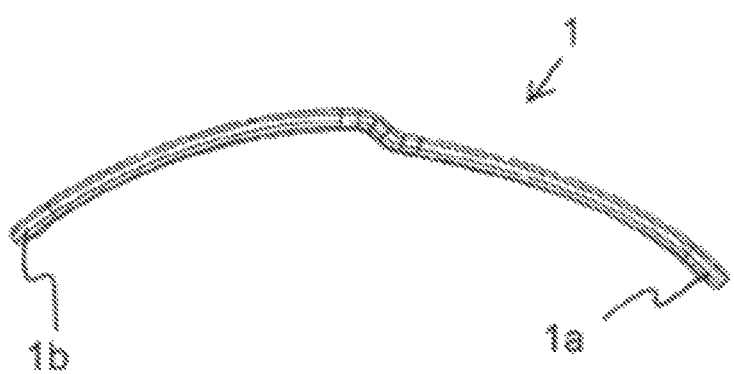

With respect to their size and geometry, the grooves 11 are configured in such a way that in each case the first leg 1a of a hairpin 1 can be rotated within the groove 11, so that an unconstrained positioning of the second leg 1b of the hairpin 1 in another groove 11 is thus enabled (also see FIGS. 2a, 2b).

The grooves 11 of the accommodating member 10 are disposed in a radiating shape about the center Z of the latter. They have side walls 11a, 11b that extend in the radial direction in relation to the center Z. The width B of the grooves 11 increases outwards in the radial direction.

The grooves 11 of the accommodating member 10 are configured to be considerably larger than the cavities or grooves of the stator in which the hairpins 1 are later to be accommodated. This facilitates fitting the U-shaped pins and can be carried out in an automated manner.

Due to the geometry of the arrangement of the grooves, it is possible, when inserting a respective hairpin 1 into a groove 11 of the accommodating member 10, to rotate the hairpin 1 about the leg 1a thereof, which is already accommodated in the groove 11. That means the leg 1a in the groove 11 forms a rotation axis. The crown of mutually superposed hairpins 1, which will later, i.e., after the removal from the pre-fitting nest 100, be inserted into the stator, is formed in a non-constrained manner in the pre-fitting nest 100.

Figure 3A:
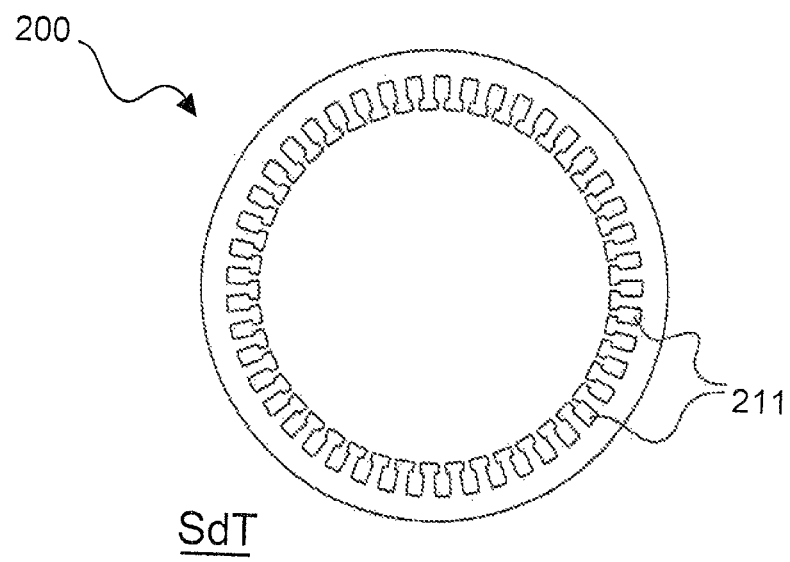
FIGS. 3a and 3b show a schematic illustration of a known stator as a top view in a total view (FIG. 3a) and in an enlarged partial view (FIG. 3b) with a plurality of grooves for accommodating hairpins.
Figure 3B:
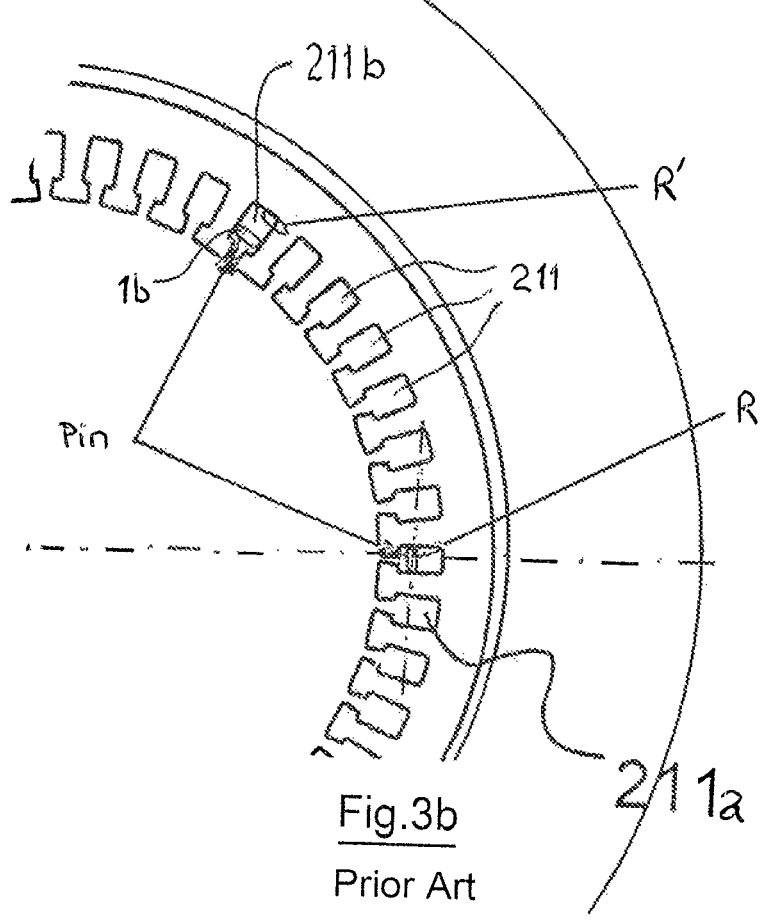

In contrast, in the known stator shown by way of example in FIG. 3, no rotation of the respective hairpin leg 1b about the rotation point R is possible when inserting the hairpin. That means that here, the individual hairpins 1 are unable to rotate about the leg 1a already fitted into the groove 211a of the stator 200, so that no rotation R' can occur. Thus, tensions arise during or after the fitting of the hairpins into the stator, which may have disadvantageous effects.

Due to the grooves 11 of the pre-fitting nest 100 according to the invention being enlarged as compared with the stator, and due to the geometry of the grooves 11 and their arrangement, which enables the rotation of the hairpin legs 1a, 1b in the respective groove 11 during fitting, the hairpins 1 can be positioned in the pre-fitting nest 100 in an automated manner, e.g., by means of a robot. Tensions are avoided when the hairpins 1 are fitted.

Then, the hairpins may be inserted in an automated manner into the future stator as a finished crown or as a crown assembly of several crowns. Thus, a reliable, automated and tension-free forming of hairpin crowns in stators is made possible by means of the pre-fitting nest according to the invention.

Figure 4A:
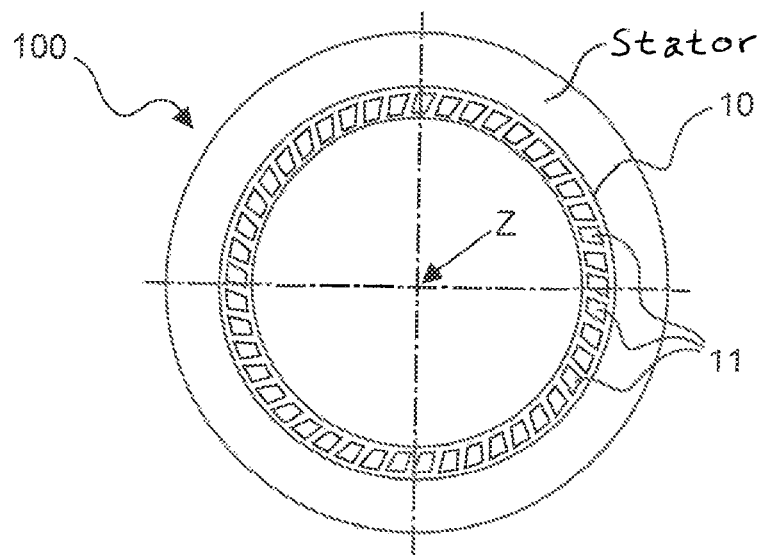
FIGS. 4a and 4b show a schematic illustration of a pre-fitting nest of the invention with offset webs, as a view from above (FIG. 4a) and as an enlarged partial view from above (FIG. 4a)
Figure 4B:
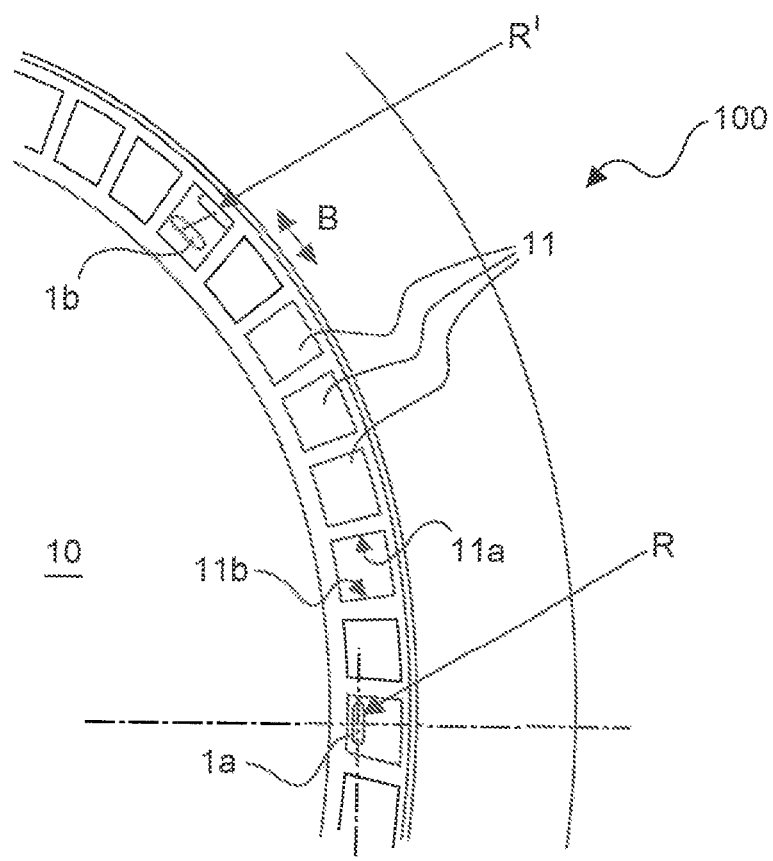
Figure 5:
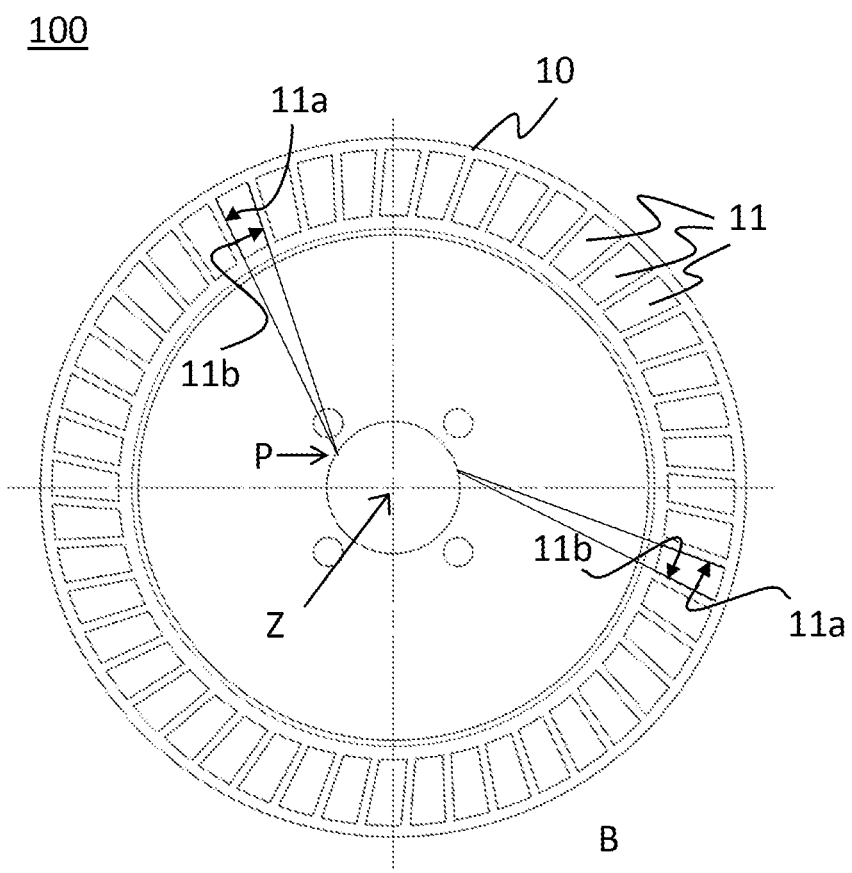
FIG. 5 shows a schematic illustration of a pre-fitting nest of the invention with offset webs or grooves, as an enlarged view from above.

FIGS. 4a and 4b show another exemplary embodiment of the invention in a view from above or as an enlarged partial view from above. FIG. 5 shows an enlarged view from above. In the pre-fitting nest 100 according to this example, the grooves 11 are disposed in a slightly offset manner. This arrangement may be referred to as turbine-shaped.

The side walls 11a, 11b of the grooves 11 each extend in the direction of a point P outside the center Z of the pre-fitting nest 100 (see FIG. 5). The points P of the respective grooves 11 are disposed on a circle around the center Z.

The width B of the grooves 11 increases outwards in the radial direction also in this exemplary embodiment. The other details and features of this exemplary embodiment are as described above with reference to the first exemplary embodiment.

When a hairpin 1 is positioned, the latter is able rotate about its leg 1a, which is located in a groove 11. The rotation point or rotation axis is marked with an R in FIG. 4b. As a result, the other end of the hairpin, i.e., its leg 1b, is able to rotate in the accommodating member 10 or its groove 11 about the rotation point or rotation axis R. The rotary movement of the leg 1b about the leg 1a is labeled R'.

The geometry of the grooves 11 is configured such that this rotation is made possible. Since the pins have more space in the accommodating means and are not exposed to any force, the pins are not damaged during fitting. In addition, the pins fall into the intended positions better and more easily due to the influence of gravity.

The offset grooves or webs result in an even larger clearance for the hairpins. This results in an even further improved tension-free arrangement of the hairpins in the shape of one or more crowns.

Figure 6A:
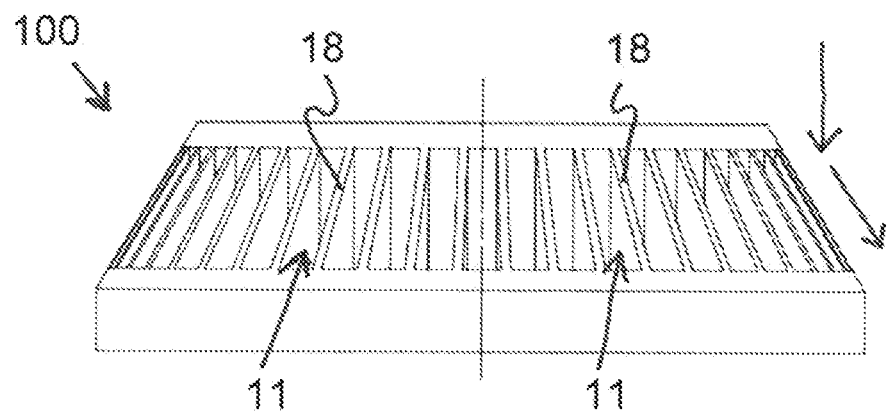
FIGS. 6a and 6b show a schematic illustration of the upper part of a pre-fitting nest with inclined portions formed, as a view from the front (FIG. 6a) and as a view from above (FIG. 6b)
Figure 6B:
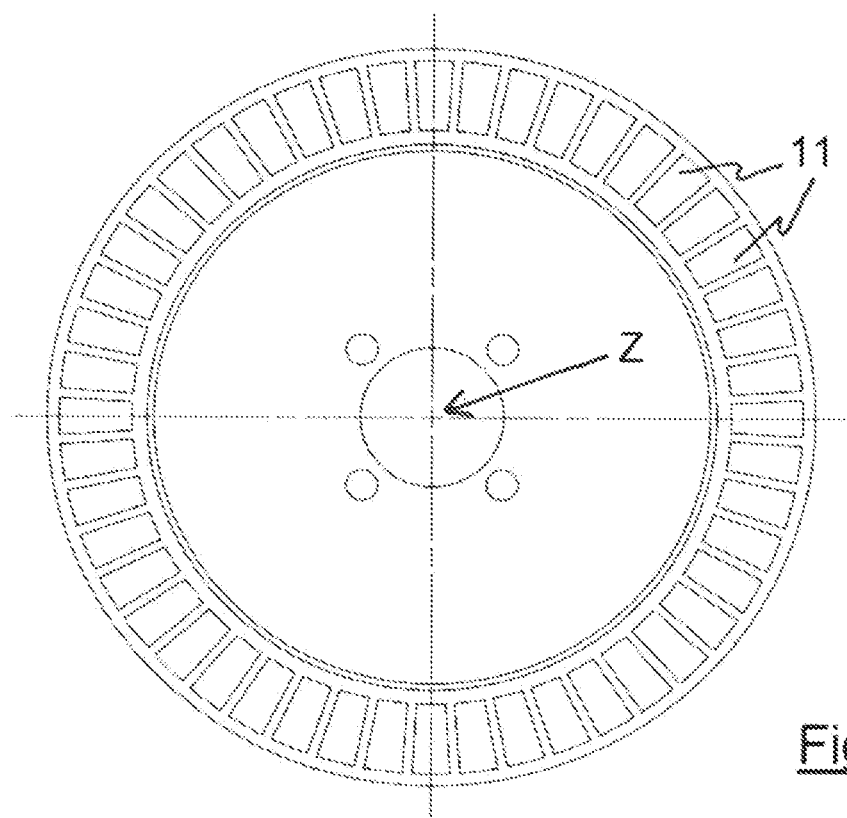

FIGS. 6a and 6b show another possible embodiment of the invention. Here, the pre-fitting nest 100 has inclined portions 18 formed on its upper side, which extend in the radial direction. In this example, the inclined portions 18 are configured to drop off in a radially outward direction. The inclined portions 18 are each located at the upper end of the grooves 11 and have the effect that the pins or hairpins, or crowns formed from them, are brought to an outer diameter or radius of the accommodating member 10 and positioned there by the influence of gravity and/or an external force.

Figure 7A:
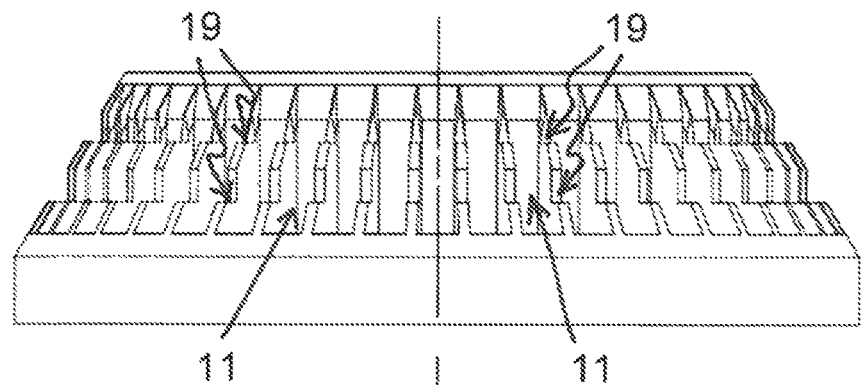
FIGS. 7a and 7b show a schematic illustration of the upper part of a pre-fitting nest with steps formed, as a view from the front (FIG. 7a) and as a view from above (FIG. 7b)
Figure 7B:
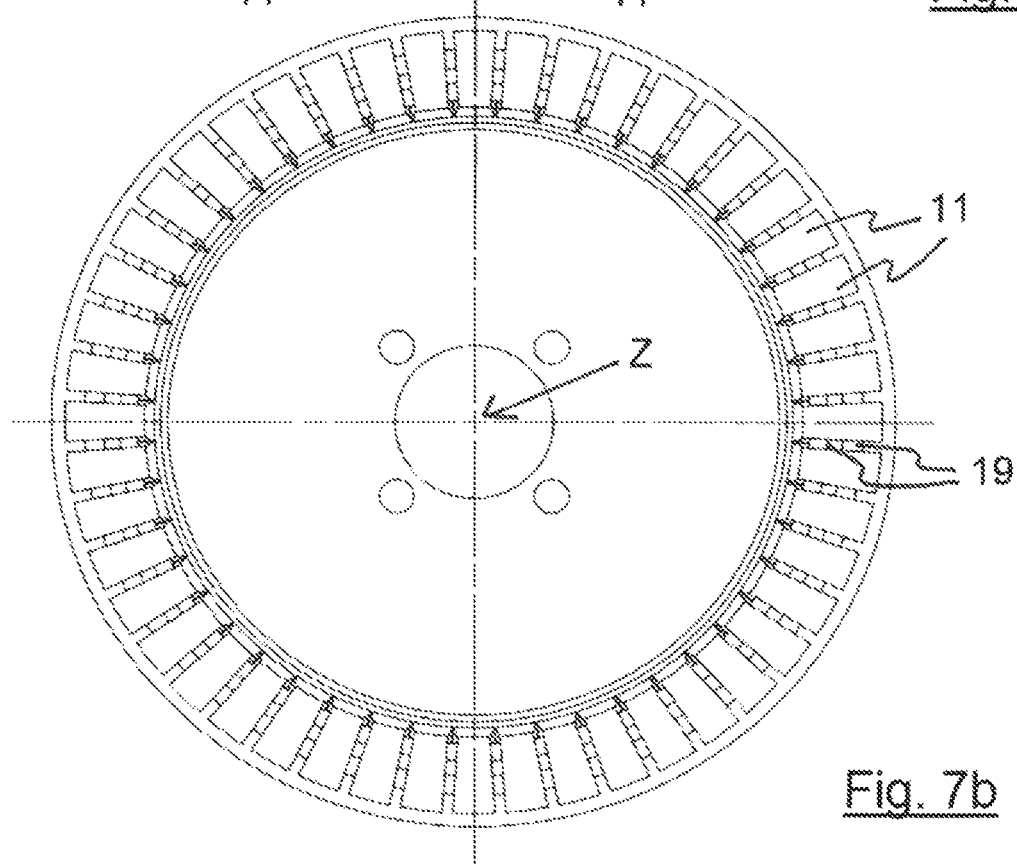

FIGS. 7a and 7b show a different possible embodiment of the invention, in which steps or offsets 19 are formed on the upper side of the pre-fitting nest 100 in the radial direction. The steps 19 are located at the upper edge of the grooves 11 and are configured to drop off in a radially outward direction in this example. Just like the inclined portions 18 described above, they have the effect that the pins or hairpins, or crowns formed from them, are brought to an outer diameter or radius of the accommodating member 10 and positioned there correspondingly by the influence of gravity and/or by an external force or force acting from outside.

That means that, when a single pin or a crown formed from pins is fitted into the grooves 11 from above, the pins or pin crowns are moved outwards into the intended radial position by means of the inclined portions 18 and/or the steps 19.

The inclined portions 18 and steps 19 may also be combined with each other.

In particular, the radial positioning of the hairpins by means of the inclined portions 18 and/or the steps 19 of the grooves 11, as described above with reference to FIGS. 6a and 6b or 7a and 7b, has the effect that, once a crown of hairpins 1 has been completed, several crowns may be joined and positioned.

The individual crowns formed from hairpins may be positioned in the radial direction in a defined manner in the accommodating means or the accommodating member 10 and held there, so that a crown to be joined does not collide with a crown that was already joined.

The reliable joining of several crowns in the accommodating means or the accommodating member 10 is thus ensured. In this case, the accommodating member 10 forms a collection receptacle for joining several crowns.

Figure 8:
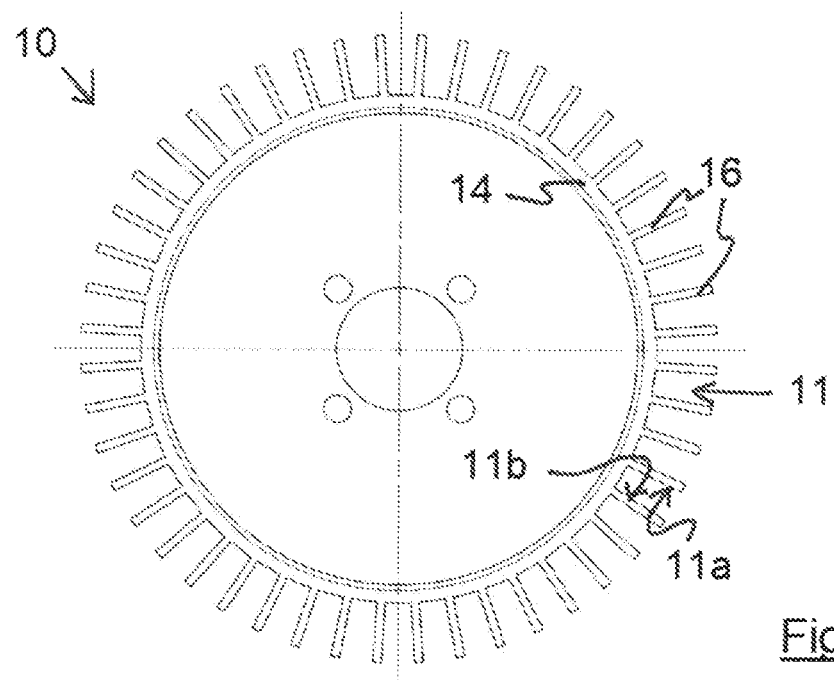
FIG. 8 shows a schematic illustration of a pre-fitting nest of the invention without an outer ring, as a view from above.

FIG. 8 shows yet another possible configuration of the accommodating member 10. Here, the accommodating member 10 has an inner ring 14 but no outer ring. Instead, the pins or hairpins are retained in the required position by the geometry of the accommodating member 10. For this purpose, the grooves 11 are formed on the outer face of the inner ring 14 of the accommodating member 10. The side walls 11a, 11b of the grooves 11 extend radially outwards from the outer face of the inner ring 14.

For this purpose, webs or projections 16 in the form of fins, which extend outwards or radially outwards from the outer face of the inner ring 14, are formed on the inner ring 14. Thus, the projections 16 form holding members for the hairpins 1. For example, bolts, spikes, metal sheets or other holding members may also be mounted on the inner ring 14, which accommodate the pins or form grooves for accommodating the pins.

Figure 9:
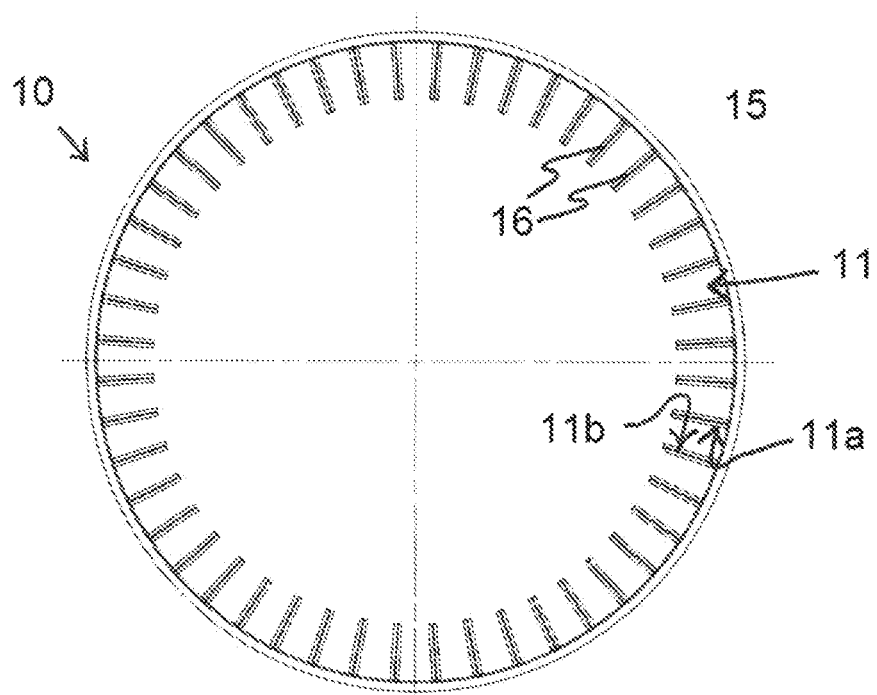
FIG. 9 shows a schematic illustration of a pre-fitting nest of the invention without an inner ring, as a view from above.

FIG. 9 shows another possible configuration of the accommodating member 10, in which only an outer ring 15 exists, but no inner ring. Webs or projections 16 in the form of fins extend inwards or radially inwards from the outer ring 15 and thus form holding members for the hairpins 1. Also in this case, bolts, spikes, metal sheets or other holding members, for example, may be installed, which accommodate the pins or form grooves for accommodating the pins.

It is also possible to provide both an inner ring 14 and an outer ring 15, between which the grooves 11 for accommodating the hairpins at their legs 1a, 1b extend.

A method for forming a crown from a plurality of U-shaped electrically conductive hairpins will be described below by way of example. The method serves for being able to subsequently install the crown in a machine element of an electric machine, particularly in a stator for an electric motor for motor vehicles.

In this method, a plurality of U-shaped electrically conductive hairpins 1 is provided first (see FIGS. 2a and 2b).

The hairpins 1 are now joined by fitting their legs 1a, 1b into the accommodating member 10 (see, for example, FIG. 1 and FIG. 5). In this way, the hairpins 1 form a crown together.

When the hairpins 1 are fitted into the accommodating member 10, a first leg 1a of the respective hairpin 1 is rotatably held in the accommodating member 10, so that the second leg 1b of the respective hairpin 1 can be positioned in the accommodating member 10 by rotation about the first leg 1a (see, for example, FIG. 4b).

For easier, non-constrained positioning, the grooves 11 in the accommodating member 10 are considerably larger than the grooves of the stator in which the hairpins are later to be accommodated. The grooves 11 may also be disposed in a radiating shape and/or in an offset manner relative to one another.

During the fitting process, the hairpins 1 fall into their respectively intended position due to the influence of gravity.

In particular, inclined portions 18 or offsets 19 are provided for improved positioning, as they are described above with reference to FIGS. 6a and 6b or 7a and 7b.

The crown of hairpins formed in the manner is then provided for introduction into a machine element or a hairpin accommodating means of a machine element, wherein the machine element is a stator in this example. Then, the crown may be inserted into the stator. Also, several crowns may be inserted into the stator one after the other, for instance.

In particular, using the pre-fitting nest 100, several crowns may also be formed in the method by joining individual hairpins, and may be joined to form a multi-layer crown member. This assembly of several crowns may then be removed from the pre-fitting nest 100 and inserted into the stator as a complete package.

Moreover, several pre-fitting nests may be used for manufacturing a crown assembly consisting of several hairpin crowns. In this case, the individual crowns of hairpins are formed with different diameters in a pre-fitting nest or in several pre-fitting nests. The crowns with different diameters formed in this manner are then arranged together in a further pre-fitting nest, which in this case serves as a collection receptacle or collection pre-fitting nest and is configured for this purpose.

The forming of the crown or crowns from hairpins and the subsequent delivery and insertion into the housing of a machine element, which is a stator housing, for example, preferably takes place in an automated manner, e.g., by means of a robot.

Due to the geometry of the accommodating means or the accommodating member 10, it is thus possible with a robot to fit the hairpins to form a crown, and to collect several hairpin crowns in an accommodating means.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

1 Hairpin
1a, 1b Hairpin leg
10 Accommodating member
11 Grooves
11a, 11b Side walls of grooves
14 Inner ring
15 Outer ring
16 Projections, fins
18 Inclined portion
19 Offset
100 Pre-fitting nest
200 Stator
211 Grooves of stator
211a, 211b Grooves of stator
B Width of grooves
P Point outside the center
R Rotation point or axis
R' Rotary movement
Z Center

The invention claimed is:

1. A method for forming a crown from a plurality of U-shaped electrically conductive hairpins to then be able to install the crown in a machine element of an electric machine, comprising the steps of:
providing a plurality of U-shaped electrically conductive hairpins;
joining the hairpins by fitting the legs of the hairpins into an accommodating member, so that the hairpins together form a crown;
wherein, when the respective hairpin is fitted into the accommodating member, a first leg of the hairpin is rotatably held in the accommodating member to position a second leg of the hairpin in the accommodating member by rotation of the hairpin, wherein the accommodation member is dimensioned so that the hairpin rotates within the accommodation member;
then providing the crown of hairpins for introduction into a hairpin accommodating means of the machine element.

2. The method according to claim 1, wherein the accommodating member has grooves for accommodating the hairpins, which are at least one of:
larger than the grooves of the machine element for accommodating the hairpins,
disposed in a radiating shape, or
disposed in an offset manner relative to one another.

3. The method according to claim 1, wherein the hairpins fall into their respectively intended position due to an influence of gravity.

4. The method according to claim 1, wherein several crowns are formed and joined to form a multi-layer crown member.

5. The method according to claim 1, wherein the method is carried out with a pre-fitting nest comprising:
the accommodating member with a plurality of grooves configured to accommodate legs of the U-shaped hairpins,
wherein the grooves are annularly disposed about a center of the accommodating member and extend perpendicularly to a plane of a surface of the accommodating member, and
wherein the grooves are configured, with respect to their size and geometry, such that for each hairpin, the first leg rotates within a first groove to enable an unconstrained positioning of the second leg of the hairpin in another groove.

6. The method of claim 1, wherein the hairpin is rotated without tension between the legs of the hairpin.

7. The method of claim 1, wherein both legs of the hairpin rotate when the hairpin is rotated.

8. A method for forming a crown from a plurality of U-shaped electrically conductive hairpins to then be able to install the crown in a machine element of an electric machine, comprising the steps of:
providing a plurality of U-shaped electrically conductive hairpins;
joining the hairpins by fitting the legs of the hairpins into an accommodating member, so that the hairpins together form a crown;
wherein, when the respective hairpin is fitted into the accommodating member, the hairpin is rotatably held in the accommodating member to position a leg of the hairpin in the accommodating member by rotation of the hairpin, wherein the accommodation member is dimensioned so that the hairpin rotates within the accommodation member;
then providing the crown of hairpins for introduction into a hairpin accommodating means of the machine element.

9. The method according to claim 8, wherein the accommodating member has grooves for accommodating the hairpins, which are at least one of:
larger than the grooves of the machine element for accommodating the hairpins,
disposed in a radiating shape, or
disposed in an offset manner relative to one another.

10. The method according to claim 8, wherein the hairpins fall into their respectively intended position due to an influence of gravity.

11. The method according to claim 8, wherein several crowns are formed and joined to form a multi-layer crown member.

12. The method according to claim 8, wherein the method is carried out with a pre-fitting nest comprising:
   the accommodating member with a plurality of grooves configured to accommodate legs of the U-shaped hairpins,
   wherein the grooves are annularly disposed about a center of the accommodating member and extend perpendicularly to a plane of a surface of the accommodating member, and
   wherein the grooves are configured, with respect to their size and geometry, such that each hairpin rotates within the accommodating member.

13. The method of claim 8, wherein the hairpin is rotated without tension between the legs of the hairpin.

14. The method of claim 8, wherein both legs of the hairpin rotate when the hairpin is rotated.

15. A method for forming a crown from a plurality of U-shaped electrically conductive hairpins to then be able to install the crown in a machine element of an electric machine, comprising the steps of:
   providing a plurality of U-shaped electrically conductive hairpins; and,
   joining the hairpins by fitting the legs of the hairpins into an accommodating member, so that the hairpins together form a crown;
   wherein, when the respective hairpin is fitted into the accommodating member, a first leg of the hairpin is rotatably held in the accommodating member to position a second leg of the hairpin in the accommodating member by rotation about the first leg,
   wherein the accommodating member comprises a plurality of grooves configured to accommodate legs of the U-shaped hairpins,
   wherein the grooves are annularly disposed about a center of the accommodating member and extend perpendicularly to a plane of a surface of the accommodating member, and
   wherein the grooves are configured, with respect to their size and geometry, such that for each hairpin, a first leg of the hairpin can be rotated within a first groove in order thus to enable an unconstrained positioning of the second leg of the hairpin in another groove.

16. The method according to claim 15, wherein the accommodating member has grooves for accommodating the hairpins, which are at least one of:
   larger than the grooves of the machine element for accommodating the hairpins,
   disposed in a radiating shape, or
   disposed in an offset manner relative to one another.

17. The method according to claim 15, wherein the hairpins fall into their respectively intended position due to an influence of gravity.

18. The method according to claim 15, wherein several crowns are formed and joined to form a multi-layer crown member.

* * * * *